US010014106B2

(12) United States Patent
Fujita et al.

(10) Patent No.: US 10,014,106 B2
(45) Date of Patent: Jul. 3, 2018

(54) COIL FOR NON-CONTACT POWER TRANSMISSION SYSTEM AND NON-CONTACT POWER TRANSMISSION SYSTEM

(71) Applicant: Panasonic Intellectual Property Management Co., Ltd., Osaka (JP)

(72) Inventors: Atsushi Fujita, Shiga (JP); Hideki Sadakata, Shiga (JP); Yoshiharu Omori, Shiga (JP); Hiroaki Kurihara, Shiga (JP); Daisuke Bessyo, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 246 days.

(21) Appl. No.: 14/813,055

(22) Filed: Jul. 29, 2015

(65) Prior Publication Data

US 2015/0332849 A1 Nov. 19, 2015

Related U.S. Application Data

(63) Continuation of application No. PCT/JP2014/000441, filed on Jan. 29, 2014.

(30) Foreign Application Priority Data

Jan. 30, 2013 (JP) ................................ 2013-015075

(51) Int. Cl.
*H01F 27/42* (2006.01)
*H01F 37/00* (2006.01)
(Continued)

(52) U.S. Cl.
CPC ............. *H01F 38/14* (2013.01); *H01F 27/24* (2013.01); *H01F 27/346* (2013.01); *H01F 27/38* (2013.01); *H02J 5/005* (2013.01); *H01F 27/2823* (2013.01); *H02J 50/10* (2016.02); *H02J 50/70* (2016.02)

(58) Field of Classification Search
CPC .......... H02J 5/005; H02J 17/005; H02J 7/025; H01F 38/14; H01F 27/24; H01F 27/2823
USPC ......................................................... 307/104
See application file for complete search history.

(56) References Cited

U.S. PATENT DOCUMENTS 5,814,900 A * 9/1998 Esser ...................... H01F 38/18 307/104
2007/0131505 A1* 6/2007 Kim ........................ B60L 5/005 191/14
(Continued)

FOREIGN PATENT DOCUMENTS

JP 2011-050127 A 3/2011
JP 2012-231603 A 11/2012
(Continued)

OTHER PUBLICATIONS

International Search Report issued in corresponding International Patent Application No. PCT/JP2014/000441 dated Apr. 28, 2014; 5 pages with English translation.
(Continued)

*Primary Examiner* — Rexford Barnie
*Assistant Examiner* — Rasem Mourad
(74) *Attorney, Agent, or Firm* — McDermott Will & Emery LLP

(57) ABSTRACT

A coil for a non-contact power transmission system according to the present disclosure is used in a non-contact power transmission system to transmit electric power via a non-contact method. The coil includes a first coil in which a wire is wound around at a center of a core; and a second coil placed at an end of the core, and wound with the wire. Winding axes of the first and second coils are oriented in different directions.

4 Claims, 5 Drawing Sheets

4
5
5
32
31
32
1
2
3

(51) Int. Cl.

| | |
|---|---|
| ***H01F 38/00*** | (2006.01) |
| ***H01F 38/14*** | (2006.01) |
| ***H01F 27/24*** | (2006.01) |
| ***H02J 5/00*** | (2016.01) |
| ***H01F 27/34*** | (2006.01) |
| ***H01F 27/38*** | (2006.01) |
| *H01F 27/28* | (2006.01) |
| *H02J 50/70* | (2016.01) |
| *H02J 50/10* | (2016.01) |

(56) References Cited

U.S. PATENT DOCUMENTS

| | | | | |
|---|---|---|---|---|
| 2011/0089768 A1* | 4/2011 | Byrne | H01F 38/14 | |
| | | | 307/104 | |
| 2012/0025602 A1* | 2/2012 | Boys | H02J 5/005 | |
| | | | 307/9.1 | |
| 2012/0223573 A1* | 9/2012 | Schatz | H02J 5/005 | |
| | | | 307/9.1 | |
| 2014/0085035 A1* | 3/2014 | Kim | H01F 27/38 | |
| | | | 336/212 | |

FOREIGN PATENT DOCUMENTS

| | | | | |
|---|---|---|---|---|
| JP | 2012231603 A | * | 11/2012 | H01F 38/14 |
| JP | 2014-011332 A | | 1/2014 | |
| WO | 2013/062427 A1 | | 5/2013 | |

OTHER PUBLICATIONS

Extended European Search Report issued in corresponding European Patent Application No. 14746584.3, dated Mar. 29, 2016.

* cited by examiner

FIG.7A
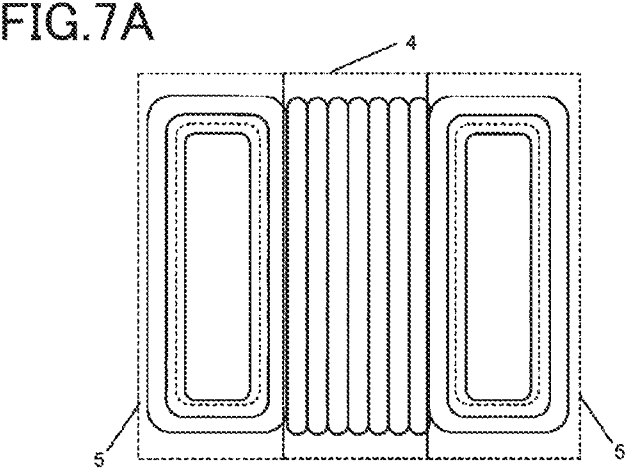
FIG.7C
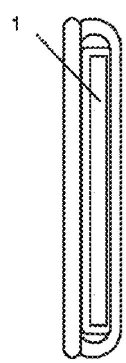
FIG.7B
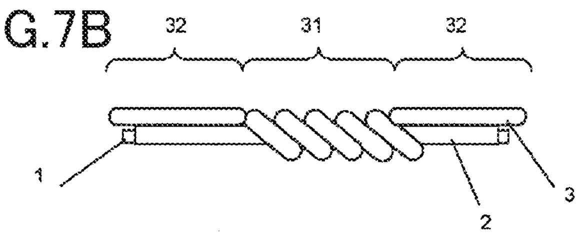
FIG.8A
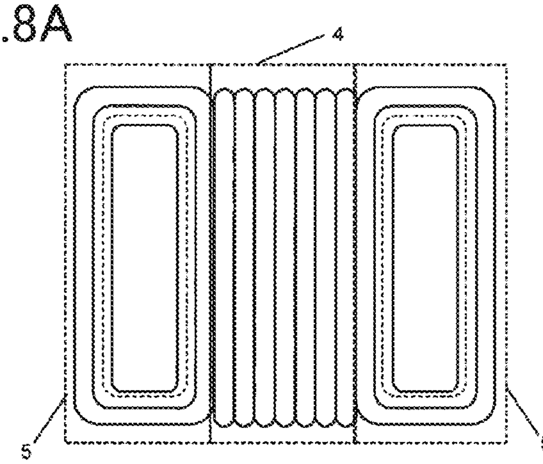
FIG.8C
FIG.8B
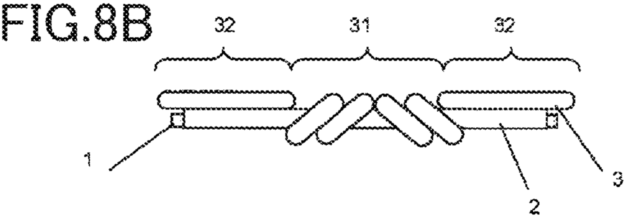

COIL FOR NON-CONTACT POWER TRANSMISSION SYSTEM AND NON-CONTACT POWER TRANSMISSION SYSTEM

CROSS-REFERENCE TO RELATED APPLICATIONS

This is a continuation of International Application No. PCT/JP2014/000441 filed on Jan. 29, 2014, which claims priority to Japanese Patent Application No. 2013-015075 filed on Jan. 30, 2013. The entire disclosures of these applications are incorporated by reference herein.

BACKGROUND

The present disclosure relates to coils for non-contact power transmission systems for use in, for example, charging electric propulsion vehicles such as electric vehicles and plug-in hybrid vehicles.

In a conventional non-contact power supply system, each of its power supplier and power receiver includes a coil comprised of a core, and a wire wound around the core. In such a so-called "double-side winding" system formed by winding a wire around a core is believed to be greatly tolerable about horizontal misalignment or variation in a vertical gap length between the power supplier and the power receiver. (See, for example, Japanese Patent Publication No. 2011-50127.)

SUMMARY

In a coil for a non-contact power transmission system for use in, for example, charging an electric propulsion vehicle, an RF current is supplied to a wire to transmit electric power, and the magnetic field is radiated mostly from a core. Not all the magnetic field radiated from the coil of the power supplier reaches the coil of a power receiver and is converted to electric power for charge. Actually, there is a significant leakage magnetic field. The leakage magnetic field increases the magnetic flux density around the non-contact power transmission system so much that a human body could be exposed to the magnetic field to a certain degree. The leakage magnetic field also generates radiation noise to cause negative influences such as malfunction of other electronic devices.

If a metal shield is provided near the power supplier or the power receiver to reduce such a leakage magnetic field, the leakage magnetic field inductively heats the metal shield itself and makes the metal shield generates some heat. Even if a metal shield is provided near the power supplier or the power receiver to protect the non-contact power transmission system in case of a crush of a vehicle, a similar problem will occur. This induction heating occurs in metal components arranged near the coil to cause a similar problem. This leads to deterioration in power transmission efficiency, degradation of components caused by a temperature rise inside the housing of the non-contact power transmission system and other inconveniences.

It is therefore, an objective of the present disclosure to provide a high efficiency coil for a non-contact power transmission system with such radiation noise and induction heating of surrounding metal components minimized by reducing the leakage magnetic field.

A coil for a non-contact power transmission system according to the present disclosure is used in a non-contact power transmission system to transmit electric power via a non-contact method. The coil includes a first coil in which a wire is wound around a center of a core; and a second coil placed at an end of the core wound with the wire. Winding axes of the first and second coils are oriented in different directions.

According to the present disclosure, radiation of the magnetic field emitted from an end of a core is easily oriented toward one of a power transmitting coil and a receiving coil facing each other. This reduces the magnetic field leaking outside a non-contact power transmission system, thus minimizing radiation noise and induction heating of surrounding metal components.

BRIEF DESCRIPTION OF THE DRAWINGS

FIGS. 7A-7C generally illustrate a coil for a non-contact power transmission system according to a fifth embodiment.

FIGS. 8A-8C generally illustrate a coil for a non-contact power transmission system according to a fifth embodiment.

DETAILED DESCRIPTION

Embodiments of the present disclosure will now be described with reference to the drawings. Note that the following description of embodiments is not intended to limit the scope of the present disclosure.

First Embodiment

Figure 1A:
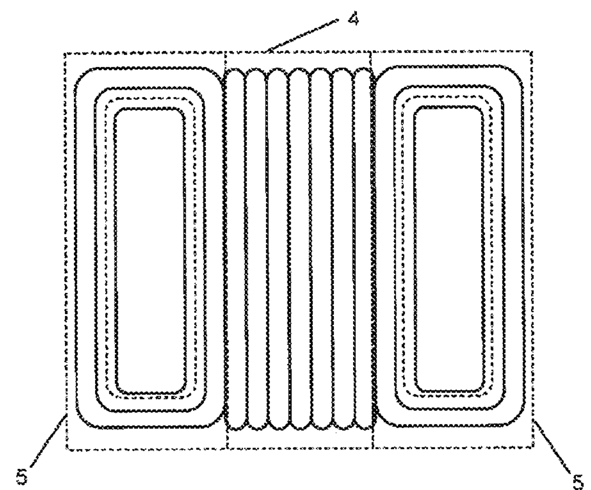
FIGS. 1A-1C generally illustrate a coil for a non-contact power transmission system according to a first embodiment.
Figure 1C:
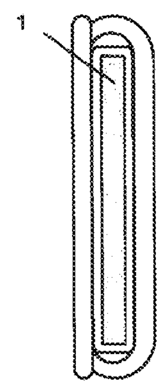
Figure 1B:
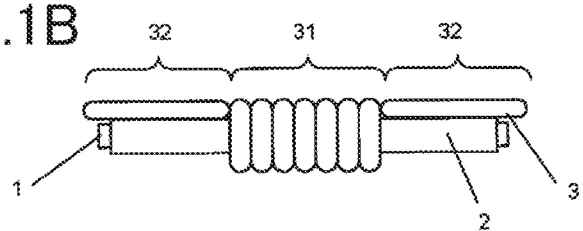

FIGS. 1A-1C generally illustrate a coil for a non-contact power transmission system according to a first embodiment of the present disclosure. FIG. 1A is a top view. FIGS. 1B and 1C are side views.

A coil for a non-contact power transmission system according to this embodiment is used in a non-contact power transmission system to transmit electric power via a non-contact method. The coil includes a core 1, a bobbin 2, and a wire 3. The core 1 is formed to have a flat outer shape by arranging a plurality of ferrite elements. The bobbin 2 around the core 1 covers at least a portion of the core 1 and is made of an insulating resin.

The wire 3 is a single wire which is not in direct contact with the core 1. The wire 3 has a first wire portion 31, and substantially elliptic second wire portions 32. The first wire portion 31 is wound around the center of the core 1 with the bobbin 2 interposed therebetween. The second wire portions 32 are not in direct contact with the core 1, but wound, in a generally swirl pattern in a plan view, around the ends of the core 1 with the bobbin 2 interposed therebetween.

With the configuration described above, the first and second wire portions 31 and 32 with the core 1 function as a first coil 4 and second coils 5, respectively, each of which has inductance. The coil for the non-contact power transmission system according to this embodiment includes the first and second coils 4 and 5. The first coil 4 is formed by winding the wire 3 around the center of the core 1. The second coils 5 are formed by winding the wire 3 around the ends of the core 1. The winding axes of the first and second coils 4 and 5 are oriented in different directions.

Figure 2:
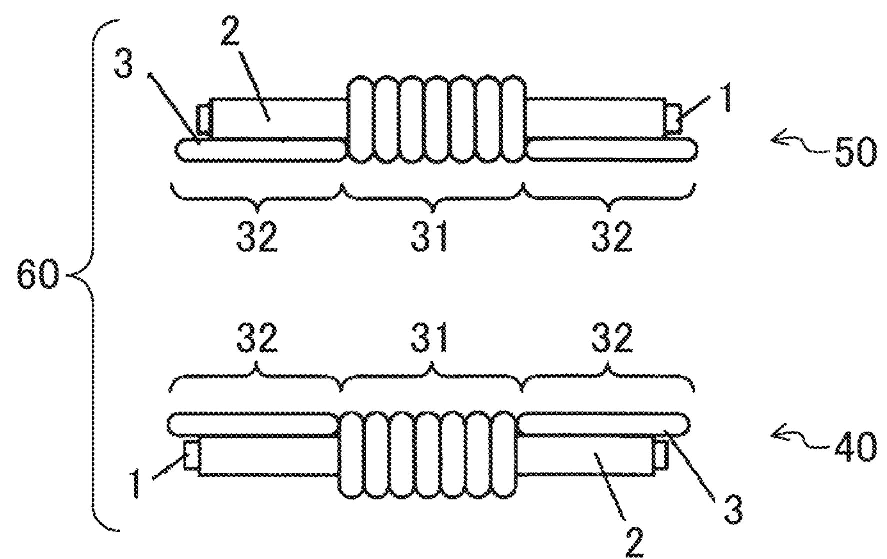
FIG. 2 generally illustrates a non-contact power transmission system according to a first embodiment.

FIG. 2 generally illustrates a non-contact power transmission system 60 which includes the coil for a non-contact power transmission system according to this embodiment as each of a power transmitting and receiving coils 40 and 50. In the non-contact power transmission system 60, the power transmitting and receiving coils 40 and 50 are substantially the same coils. When power is supplied, the coils are arranged so as to face each other, in particular, with the respective second coils 5 (i.e., the second wire portions 32) facing each other.

Figure 3A:
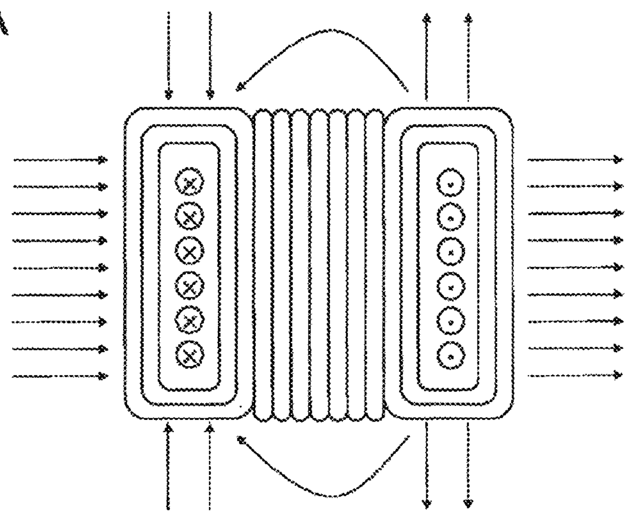
FIGS. 3A and 3B illustrate distribution of a magnetic field of a coil for a non-contact power transmission system according to a first embodiment.
Figure 3B:
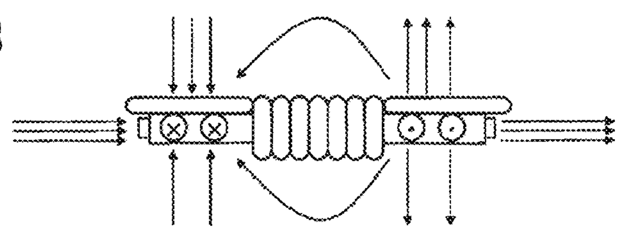

FIGS. 3A and 3B schematically illustrate distribution of the magnetic field of the coil for the non-contact power transmission system shown in FIGS. 1A-1C. Similarly to FIGS. 1A and 1B, FIG. 3A is a top view and FIG. 3B is a side view.

The core 1 radiates, in its nature, a magnetic field perpendicularly to its surface. Thus, the core 1 radiates the magnetic field not only toward the other coil that faces the former coil (in vertical direction in FIG. 3B), but also along the long axis of the core 1 (in the horizontal direction in FIG. 3B) and along the short axis of the core 1 (in the vertical direction in FIG. 3A).

The magnetic field, which has been generated near the center of the core 1 (near the first wire portion 31) when a currents flows through the wire 3, is oriented in the horizontal direction in FIG. 3B. However, in this embodiment, the second coils 5 are formed above the ends of the core 1 (on the side closer to the other coil). Each second coil 5 is comprised of the second wire portion 32 and formed in a generally swirl pattern in a plan view. In particular, in FIG. 3B, the second coil 5 radiates an intense magnetic field upward in the vertical direction. Thus, part of the magnetic field radiated along the long and short axes of the core 1 is guided by the magnetic field generated by the second coil 5 so as to be radiated upward in the vertical direction. This results in an increase in the density of a magnetic flux oriented toward the other coil as compared to a conventional coil. This reduces a leakage magnetic field.

An increase in the magnetic flux oriented toward the other coil not only reduces the leakage magnetic field which does not contribute to power transmission. Even if any metal shield (not shown) or metal components (not shown) are provided near the power supplying and receiving coils, induction heating decreases because of a reduced leakage magnetic field. This reduces deterioration in power transmission efficiency or influence such as degradation of components caused by a temperature rise inside the housing of a non-contact power transmission system.

The higher the relative permeability is in the cross-sectional area of the wound wire 3, the higher the inductance of the coil may be set to be. Such an increase in the inductance of the coil allows for radiating a magnetic field that is intense enough to transmit power as required, even if a small amount of current flows through the coil, thereby reducing loss at the coil. In this embodiment, the first coil 4 is formed by winding the wire 3 around the center of the core 1, and the relative permeability is high in the area of the wire 3, which makes it easy to set the inductance of the coil high.

The number of turns of the wire 3 wound around the core 1, and the number of turns of the wire 3 wound in a generally swirl pattern in a plan view, around each end of the core 1 may be determined in view of the required inductance, the intensity of the magnetic field required for power transmission, the quantity of heat generated by surrounding metal objects and other factors.

Second Embodiment

Figure 4A:
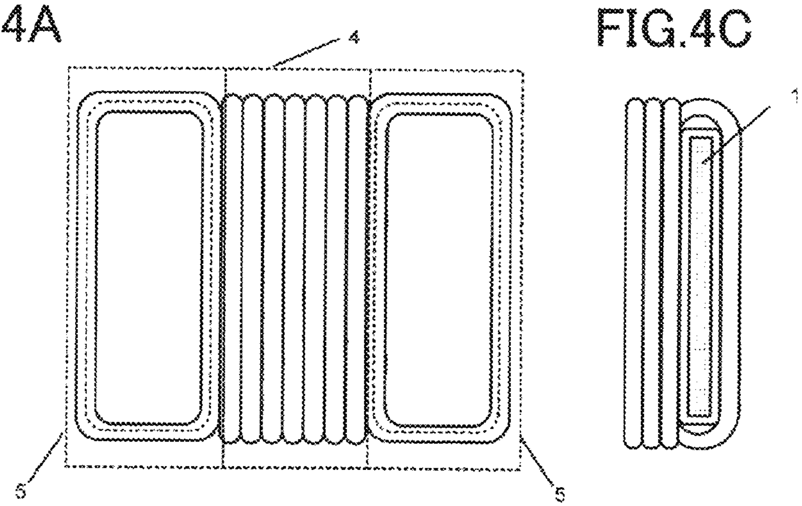
FIGS. 4A-4C generally illustrate a coil for a non-contact power transmission system according to a second embodiment.
Figure 4C:
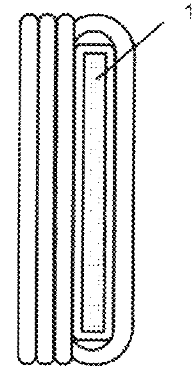
Figure 4B:
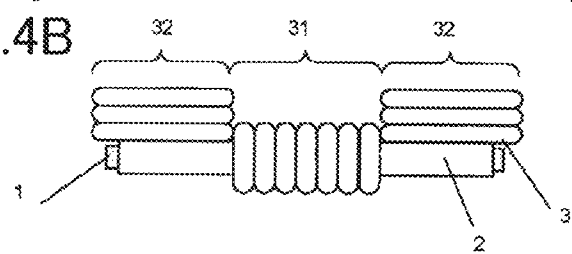

FIGS. 4A-4C generally illustrate a coil for a non-contact power transmission system according to a second embodiment. In the first embodiment, an example has been described where each second coil 5 is formed at an associated end of the core 1 by winding the wire 3 as a single layer in a swirl pattern in a plan view. In this embodiment, however, each second coil 5 is formed at an associated end of the core 1 by winding the wire 3 in a swirl pattern as a stack of multiple layers. That is, the wires 3 each being wound in a swirl pattern are stacked one on another toward the other coil that faces the second coil 5.

The density of the magnetic flux radiated by a coil depends on the amount of current flowing through the coil, the number of turns, and the cross-sectional area of the coil. If the height of the housing of the coil permits, as in this embodiment, the second coils 5 may be arranged such that the second wire portions 32 at the ends of the core 1 are multilayer coils. This further increases the magnetic flux toward the other coil. As a result, the second embodiment enables further reduction in the leakage magnetic field as compared to the first embodiment.

Third Embodiment

Figure 5A:
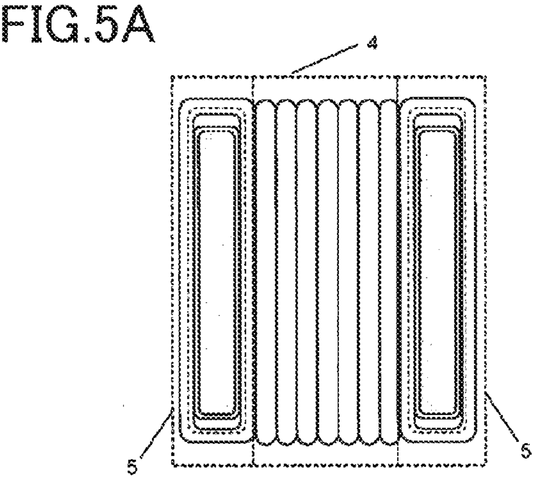
FIGS. 5A-5C generally illustrate a coil for a non-contact power transmission system according to a third embodiment.
Figure 5C:
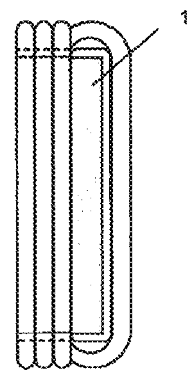
Figure 5B:
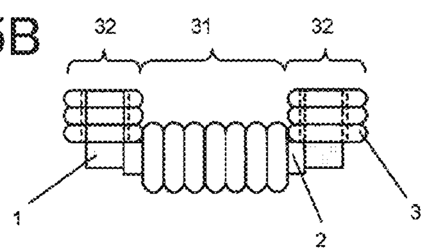

FIGS. 5A-5C generally illustrate a coil for a non-contact power transmission system according to a third embodiment. In this embodiment, the core 1 is inserted into each wire 3 according to the second embodiment, which is a stack of multiple coils disposed in a swirl pattern. Specifically, the core 1 has a bending portion bending along the winding axis of the second coil 5 at each end of the core 1. Each second coil 5 is formed by winding the wire 3 around the bending portion of the core 1.

As described above, the higher the relative permeability is in the cross-sectional area of the wound wire 3, the higher inductance of the coil may be set to be. In FIGS. 5A-5C, the bending portion of the core 1 is inserted into the center of the swirl pattern wire 3 at each end of the core 1. Thus, the inductance further increases at the second coil 5 comprised of the wire 3 at each end of the core 1, thereby increasing the density of the magnetic flux at this portion. As a result, this embodiment enables further reduction in the leakage magnetic field as compared to the second embodiment.

Fourth Embodiment

Figure 6A:
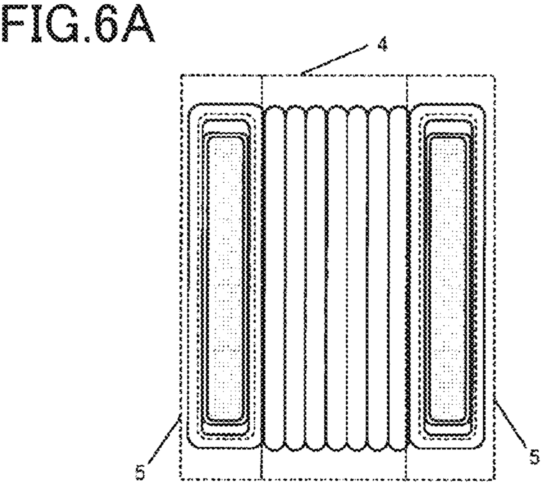
FIGS. 6A-6C generally illustrate a coil for a non-contact power transmission system according to a fourth embodiment.
Figure 6C:
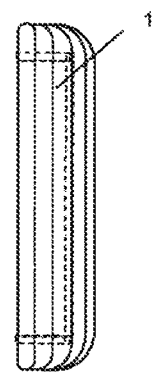
Figure 6B:
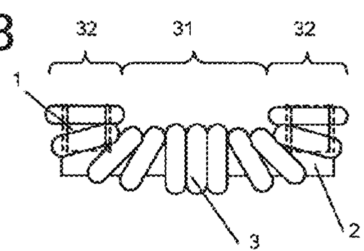

FIGS. 6A-6C generally illustrate a coil for a non-contact power transmission system according to a fourth embodiment. In this embodiment, the winding angle of the wire 3 gradually varies from the center to the end of the core 1 such that the wire 3 eventually approaches the other coil that faces the coil with that wire.

As described above, the core 1 radiates, in its nature, a magnetic field in the direction perpendicular to its surface.

Thus, the core 1 radiates the magnetic field not only toward the other coil but also along the long and short axes of the core 1.

In FIGS. 6A-6C, the wire 3 is wound around the portion in which the core 1 is exposed (the end of the core 1 along the long and short axes, and the side without the other coil (i.e., the back surface)) in the previous embodiments. Then, the magnetic field of a current flowing through the wire 3 cancels the magnetic field that is going to leak from the core 1 in all directions but the direction toward the other coil. As a result, this embodiment enables further reduction in the leakage magnetic field as compared to the other embodiments.

Fifth Embodiment

FIGS. 7A-7C and 8A-8C generally illustrate a coil for a non-contact power transmission system according to a fifth embodiment. In this embodiment, the wire 3 is wound obliquely around the center of the core 1 according to the first embodiment.

This configuration enables a reduction in the thickness of the coil as compared to the other embodiments described above.

Figure 9A:
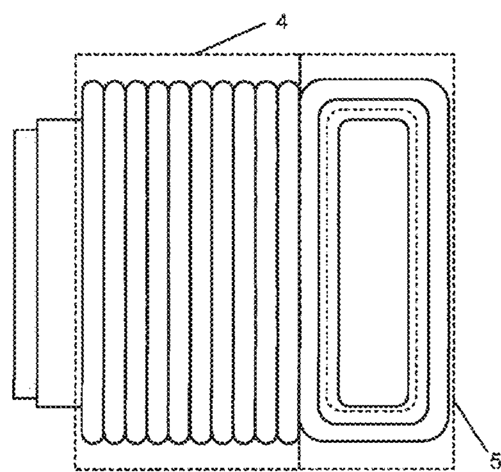
FIGS. 9A-9C generally illustrate a coil for a non-contact power transmission system including a second coil placed on one side only.
Figure 9C:
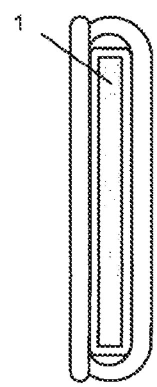
Figure 9B:
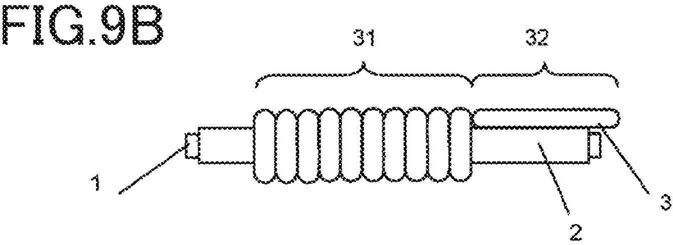

In all the above embodiments, an example has been described where the second coils 5 are placed at both ends of the core 1. The configuration is however only an example and no way limiting. For example, as shown in FIGS. 9A-9C, the second coil 5 may be placed only at one end of the core 1. Since a change in the winding direction of the wire 3 usually requires some manufacturing steps, this configuration is effective in view of the easily fabricating a coil.

The present disclosure is applicable for use as a power transmitting or receiving coil for a non-contact power transmission system at the time in, for example, charging an electric propulsion vehicle such as an electric vehicle and a plug-in hybrid vehicle.

What is claimed is:

1. A coil for use in a non-contact power transmission system transmitting electric power via a non-contact method, the coil comprising:

a first coil in which a wire is wound around at a center of a core, and a second coil placed at an end of the core wound with the wire, wherein winding axes of the first and second coils are oriented in different directions, and in the second coil, the wire is wound in a swirl pattern in a plan view and disposed on an end portion of an upper surface of the core, the winding axis of the second coil extending upward from the upper surface of the core, wherein the core does not extend into a center of the swirl pattern formed by the second coil along the winding axis of the second coil.

2. The coil for the non-contact power transmission system of claim 1, wherein the winding axis of the second coil is perpendicular to the winding axis of the first coil.

3. A non-contact power transmission system comprising:

a power supplier including a power transmitting coil; and a power receiver including a power receiving coil, wherein each of the power transmitting and receiving coils include the structure as recited in claim 1, and the power transmitting and receiving coils are arranged with the respective second coils facing each other.

4. The coil for the non-contact power transmission system of claim 1, wherein the upper surface of the core is a planar surface, and the core has a rectangular shape when viewed in cross-section.

* * * * *